United States Patent
Lin et al.

(10) Patent No.: US 12,020,481 B2
(45) Date of Patent: Jun. 25, 2024

(54) METHOD AND SYSTEM FOR SPORT GAME VIDEO PROCESSING

(71) Applicant: INDUSTRIAL TECHNOLOGY RESEARCH INSTITUTE, Hsinchu (TW)

(72) Inventors: Feng-Sheng Lin, Zhubei (TW); Sheng-Han Wu, Zhuangwei Township (TW); Ruen-Rone Lee, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 288 days.

(21) Appl. No.: 17/506,805

(22) Filed: Oct. 21, 2021

(65) Prior Publication Data

US 2023/0129751 A1 Apr. 27, 2023

(51) Int. Cl.
*G06V 20/40* (2022.01)
*G06T 3/00* (2024.01)
*G06T 3/18* (2024.01)
*G06V 10/94* (2022.01)

(52) U.S. Cl.
CPC ............... *G06V 20/42* (2022.01); *G06T 3/18* (2024.01); *G06V 10/95* (2022.01); *G06V 20/46* (2022.01)

(58) Field of Classification Search
CPC ........ G06V 20/40; G06V 20/41; G06V 20/42; G06V 20/43; G06V 20/44; G06V 20/62; G06V 20/49; G06V 20/46; G06V 20/47; G06V 10/94; G06V 10/95; G06V 10/96; G06V 10/82; G06V 20/35; G06F 16/70; G06T 3/0093; G06T 3/0025; G06T 3/4046
See application file for complete search history.

(56) References Cited

U.S. PATENT DOCUMENTS

| | | |
|---|---|---|
| 7,158,666 B2 | 1/2007 | Deshpande et al. |
| 8,929,720 B2 | 1/2015 | Popkiewicz et al. |
| 10,362,364 B2 | 7/2019 | Popkiewicz et al. |
| 10,554,923 B2 | 2/2020 | Rantalainen |
| 10,805,558 B2 | 10/2020 | Dragon |

(Continued)

FOREIGN PATENT DOCUMENTS

| | | |
|---|---|---|
| CN | 109523297 A | 3/2019 |
| CN | 110012348 A | 7/2019 |

(Continued)

OTHER PUBLICATIONS

Chang et al., "Virtual spotlighted advertising for tennis videos," J. Vis. Commun. Image R., vol. 21, 2010, pp. 595-612, 18 pages, total.

(Continued)

*Primary Examiner* — Edward F Urban
*Assistant Examiner* — Duy Tran
(74) *Attorney, Agent, or Firm* — Birch, Stewart, Kolasch & Birch, LLP

(57) ABSTRACT

A sports event video processing method is provided. The processing method includes: receiving a sports event input video; performing SOI detection on the sports event input video to obtain at least one SOI; performing logo detection and extraction on the at least one SOI to detect at least one logo; performing pixel-level rearrangement on the at least one detected logo; and outputting a sports event output video having completed pixel-level rearrangement.

20 Claims, 8 Drawing Sheets

(56) References Cited

U.S. PATENT DOCUMENTS

| | | | |
|---|---|---|---|
| 2009/0180702 A1* | 7/2009 | Bordes | H04N 21/8451 |
| | | | 382/239 |
| 2014/0270505 A1* | 9/2014 | McCarthy | G06V 20/635 |
| | | | 382/165 |
| 2018/0307942 A1 | 10/2018 | Pereira et al. | |
| 2020/0045378 A1* | 2/2020 | Neumeier | H04N 21/8126 |
| 2020/0082436 A1 | 3/2020 | Garcia | |
| 2021/0174118 A1* | 6/2021 | Chhabra | G06V 20/635 |
| 2021/0195286 A1* | 6/2021 | Lohumi | G06F 18/2451 |

FOREIGN PATENT DOCUMENTS

| | | |
|---|---|---|
| CN | 111738769 A | 10/2020 |
| TW | 201403514 A | 1/2014 |
| TW | 1701642 B | 8/2020 |

OTHER PUBLICATIONS

Chen et al., "Automatic Insertion of Advertisements Into a Video Sequence, " Proceedings of the Ninth International Conference on Machine Learning and Cybernetics, Qingdao, Jul. 11-14, 2010, pp. 2121-2126, 6 pages total.

Huang et al., "Virtual Ads Insertion in Street Building Views for Augmented Reality," 2011 18th IEEE International Conference on Image Processing, 2011, pp. 1117-1120, 4 pages total.

Li et al., "End-to-End Texture-Aware and Depth-Aware Embedded Advertising for Videos," Shanghai Jiao Tong University, 2020, pp. 57-61, 5 pages total.

Li et al., "Real Time Advertisement Insertion in Baseball Video Based on Advertisement Effect," Institute for Infocomm Research, 2005, pp. 343-346, 4 pages total.

Wong et al., "Markerless Augmented Advertising for Sports Videos," Markerless Sports Advertising, 2019, pp. 1-16.

Taiwanese Office Action and Search Report for Taiwanese Application No. 111100076, dated Jul. 27, 2022.

* cited by examiner

METHOD AND SYSTEM FOR SPORT GAME VIDEO PROCESSING

TECHNICAL FIELD

The disclosure relates in general to a method and system for processing sports event video, and more particularly to an automatic pixel-level rearrangement method and system for processing sports event video.

BACKGROUND

Advertisements have become more and more popular in people's daily lives such as shopping malls, stations, stadiums, and TV. Basically, advertisements can be divided into two categories, namely in-stream advertisements and embedded advertisements.

In terms of in-stream advertisements, pre-recorded advertisements are inserted into TV programs or broadcasts to promote commercial products. In-stream advertisements and the original video are seamlessly connected in timing sequence. Although in-stream advertisements produce better effects, they interfere with the viewers watching TV programs or broadcasts.

Embedded advertisements can be divided into physical advertisements and virtual advertisements. Physical advertisements increase brand/product exposure in the form of physical objects such as signboards, posters, canvas and LED banners. However, physical advertisements are often presented in a static manner, and limited to gain its visibility. On the other hand, virtual advertisements integrate virtual objects, which do not exist on site, post-processed in recorded video or real-time streaming. There are several technical issues in adoption of virtual advertisements. For example, object insertion area analysis, 3D scenery reconstruction, object material resolution harmonization and lighting effect.

Therefore, it has become a prominent task for the industries to provide a method and system for processing sports event video that increasing exposure of advertisements while minimizing the interference to audience and preventing the technical difficulties of virtual advertisements.

SUMMARY

According to one embodiment, a sports event video processing method is provided. The processing method includes: receiving a sports event input video; performing SOI detection on the sports event input video to obtain at least one SOI; performing logo detection and extraction on the at least one SOI to detect at least one logo; performing pixel-level rearrangement on the at least one detected logo; and outputting a sports event output video having completed pixel-level rearrangement.

According to another embodiment, a sports event video processing system is provided. The processing system includes a SOI detection module, a logo detection and extraction module, and a pixel-level rearrangement module. The SOI detection module is configured to receive a sports event input video and perform SOI detection on the sports event input video to obtain at least one SOI. The logo detection and extraction module is configured to perform logo detection and extraction on the at least one SOI to detect at least one logo. The pixel-level rearrangement module is configured to perform pixel-level rearrangement on the at least one detected logo. The sports event video processing system outputs a sports event output video having completed pixel-level rearrangement.

The above and other aspects of the invention will become better understood with regard to the following detailed description of the preferred but non-limiting embodiment(s). The following description is made with reference to the accompanying drawings.

Figure 1:
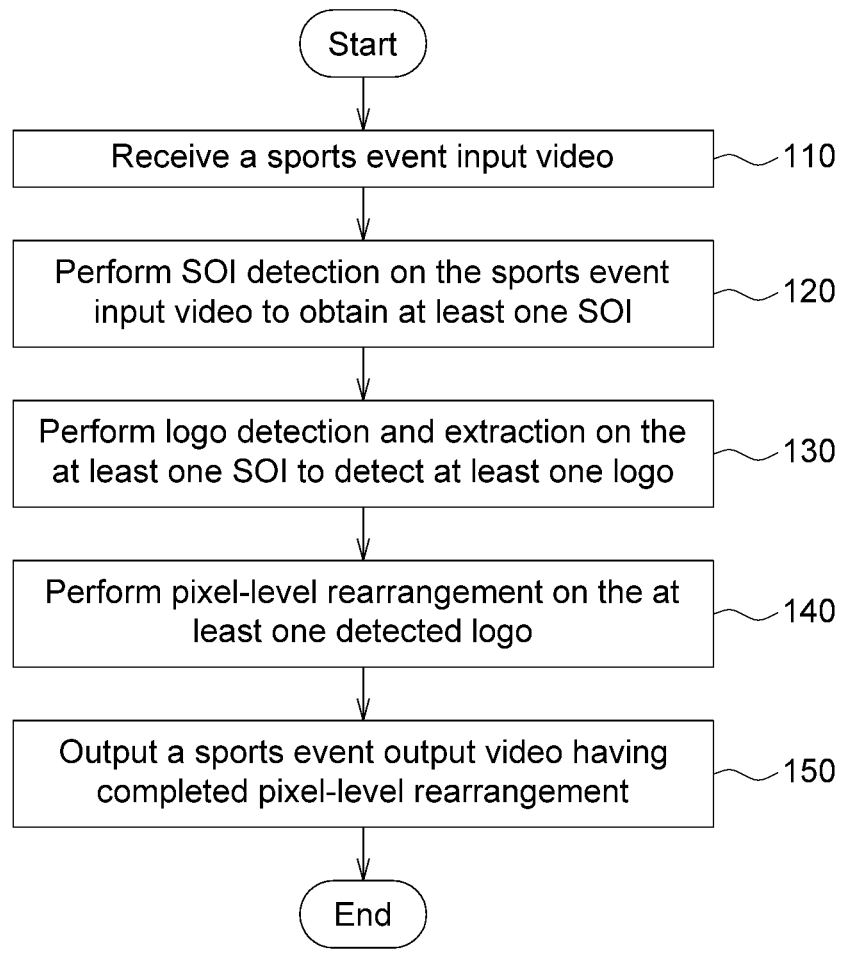
FIG. 1 is a flowchart of a sports event video processing method according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

In an embodiment of the present disclosure, shots of interest (SOI) of the pre-recorded or live streamed sports event input video are automatically determined and captured according to timing sequence, and the region of consecutive frames where commercial logo appears is automatically tracked and detected among the captured SOI in the space domain. Then, based on the position and area of the detected logo, pixel rearrangement is performed on the commercial logo, so that the physical commercial logo which is originally static in the sports event video can become dynamic and advertisement benefit can be improved. In an embodiment of the present disclosure, "static physical commercial logo" refers to hard objects (exclusive of fluttering canvas) at the scenes of sports events that are non-luminous (such as LED signboard) and are not affected by physical factors (such as wind blowing).

FIG. 1 is a flowchart of a sports event video processing method according to an embodiment of the present disclosure. The sports event video processing method automatically performs pixel-level rearrangement on physical logo in the video. In step 110, a sports event input video is received. The sports event input video includes but is not limited to pre-recorded or live streamed sports event video.

In step 120, SOI detection is performed on the sports event input video to obtain at least one SOI. Sub-steps of step 120 include but are not limited to performing SOI detection on the sports event input video to obtain at least one SOI through convolution neural networks (CNN).

In step 130, logo detection and extraction is performed on the at least one SOI to detect at least one logo. Sub-steps of step 130 include but are not limited to performing logo detection and extraction on the at least one SOI through CNN.

In step 140, pixel-level rearrangement is performed on the at least one detected logo.

In step 150, a sports event output video having completed pixel-level rearrangement is outputted.

In the video processing method according to an embodiment of the present disclosure, the step of performing SOI detection on the sports event input video through CNN includes: obtaining the at least one SOI from the sports event input video using a first CNN model having completed shot label training. Moreover, in an embodiment of the present disclosure, the step of performing shot label training on the first CNN model includes: in the training stage, performing shot and/or scene definition on relevant training video to obtain the training data, and, training the first CNN model using the training data (a large volume of labeled data).

Figure 2:
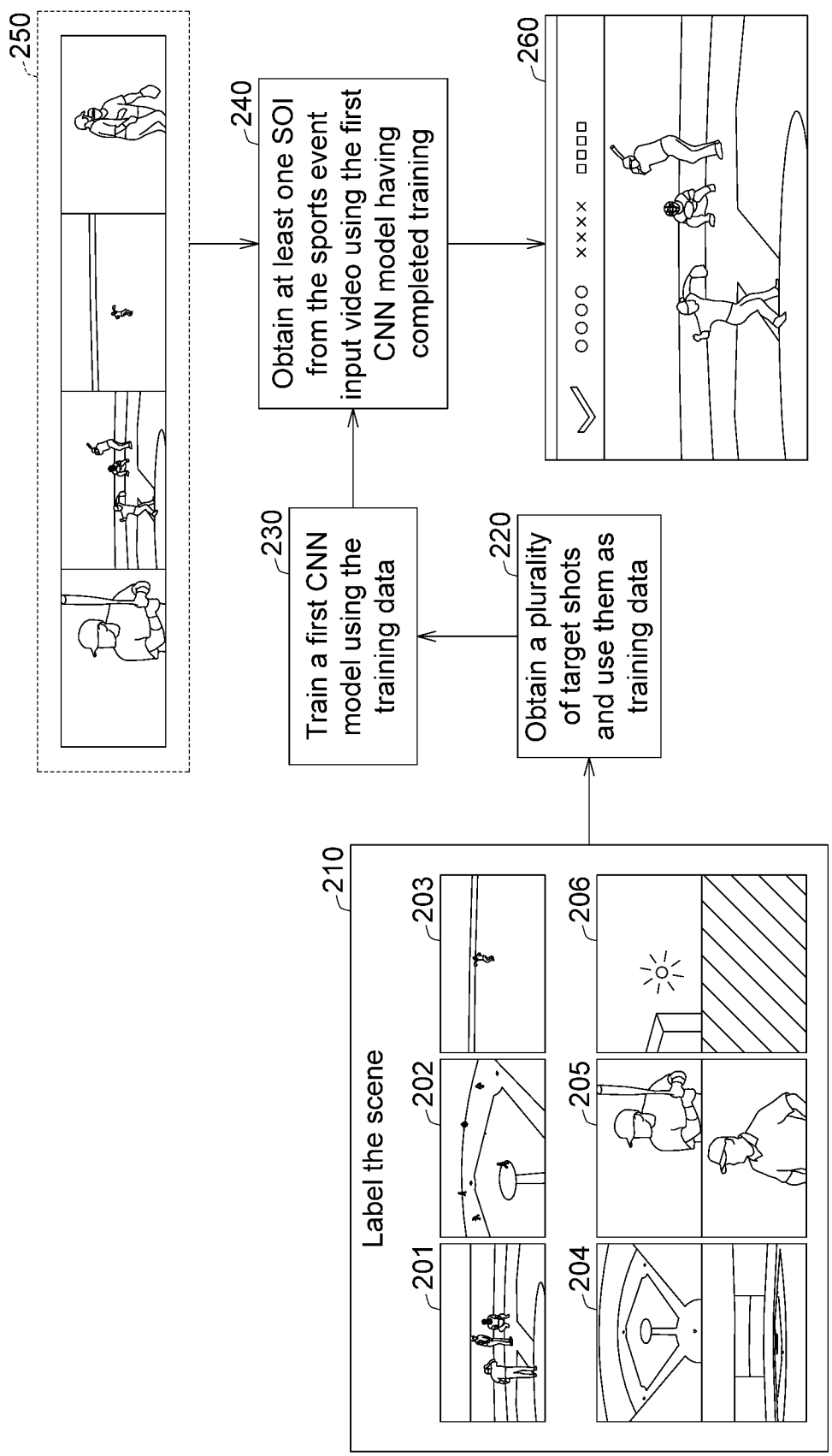
FIG. 2 illustrates sub-steps of "SOI detection" according to an embodiment of the present disclosure.

FIG. 2 illustrates sub-steps of "SOI detection" according to an embodiment of the present disclosure. In SOI detection, SOI can be captured from the sports event input video. In step 210, in the training stage, shot labeling is performed on the training video to label a target shot. The training video and the sports event input video belong to the same category. Exemplarily but not restrictively, if the input video is a baseball video, then the training video is also a baseball video. Exemplarily but not restrictively, all shots of the training video can be labeled into 6 categories, namely, pitch-batter shot 201, infield shot 202, outfield shot 203, change sides shot 204, focus shot 205 and other shots 206. Then, a target shot is selected from the labeled shots and is used as a training data. As indicated in FIG. 2, the pitch-batter shot 201 is selected as a target shot and is used as a training data.

In an embodiment of the present disclosure, the selected target shot used as the training data must meet the following criteria: (1) the target shot must contain physical (commercial) logo that is exposed and recognizable, wherein, in an embodiment of the present disclosure, the "exposed and recognizable physical (commercial) logo" refers to hard objects (exclusive of fluttering canvas) at the scenes of sports events that are non-luminous (such as LED signboard) and are not affected by physical factors (such as wind blowing); and, (2) the target shot must be captured by a camera using pan-tilt-zoom (PTZ) with minimal movement.

In step 220, several target shots are obtained and used as training data. Each of the target shots is a labeled training data (labeled as "pitch-batter shot" in the above example).

In step 230, a first CNN model is trained using the training data.

In step 240, at least one SOI 260 is obtained from the sports event input video 250 using the first CNN model having completed training.

In an embodiment of the present disclosure, when an SOI (260) is obtained, a start frame index and an end frame index of the SOI (260) are concurrently obtained. The start frame index indicates the starting frame of the SOI, and the end frame index indicates the end frame of the SOI.

In the sports event video processing method according to an embodiment of the present disclosure, the step of performing logo detection and extraction on the at least one SOI includes: performing logo detection on the at least one SOI to detect the at least one logo using a second CNN model having completed logo recognition training. During logo recognition training, a commercial logo database is inputted to the second CNN model for training purpose.

Figure 3:
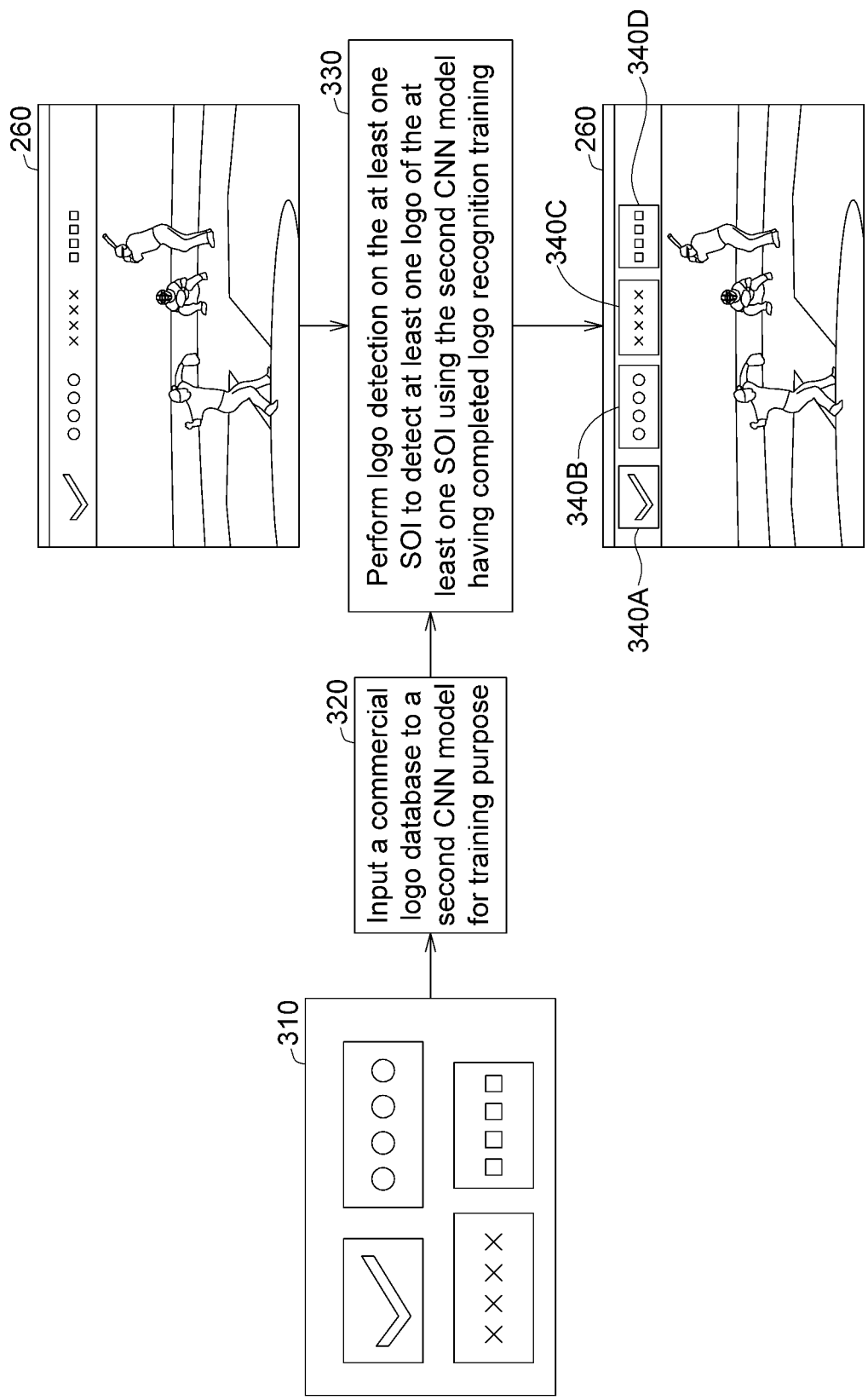
FIG. 3 illustrates sub-steps of "performing logo detection and extraction on the at least one SOI" according to an embodiment of the present disclosure.

FIG. 3 illustrates sub-steps of "performing logo detection and extraction on the at least one SOI" according to an embodiment of the present disclosure. In step 320, a commercial logo database 310 is inputted to a second CNN model for training purpose. In step 330, logo detection is performed on the at least one SOI 260 (obtained in step 240 of FIG. 2) to detect at least one logo (340A~340D) of the at least one SOI 260 using the second CNN model having completed logo recognition training, wherein, the at least one logo is a physical logo. In the present embodiment, 4 logos 340A~340D are detected as indicated in FIG. 3, but the present disclosure is not limited thereto.

In an embodiment of the present disclosure, when logo detection and extraction is performed on the at least one SOI, the position parameter and area parameter of the logo in each of the SOI are determined according to the start frame index and the end frame index of the SOI. In the example of FIG. 3, respective position parameter and area parameter of the logos 340A~340D are obtained.

Figure 4:
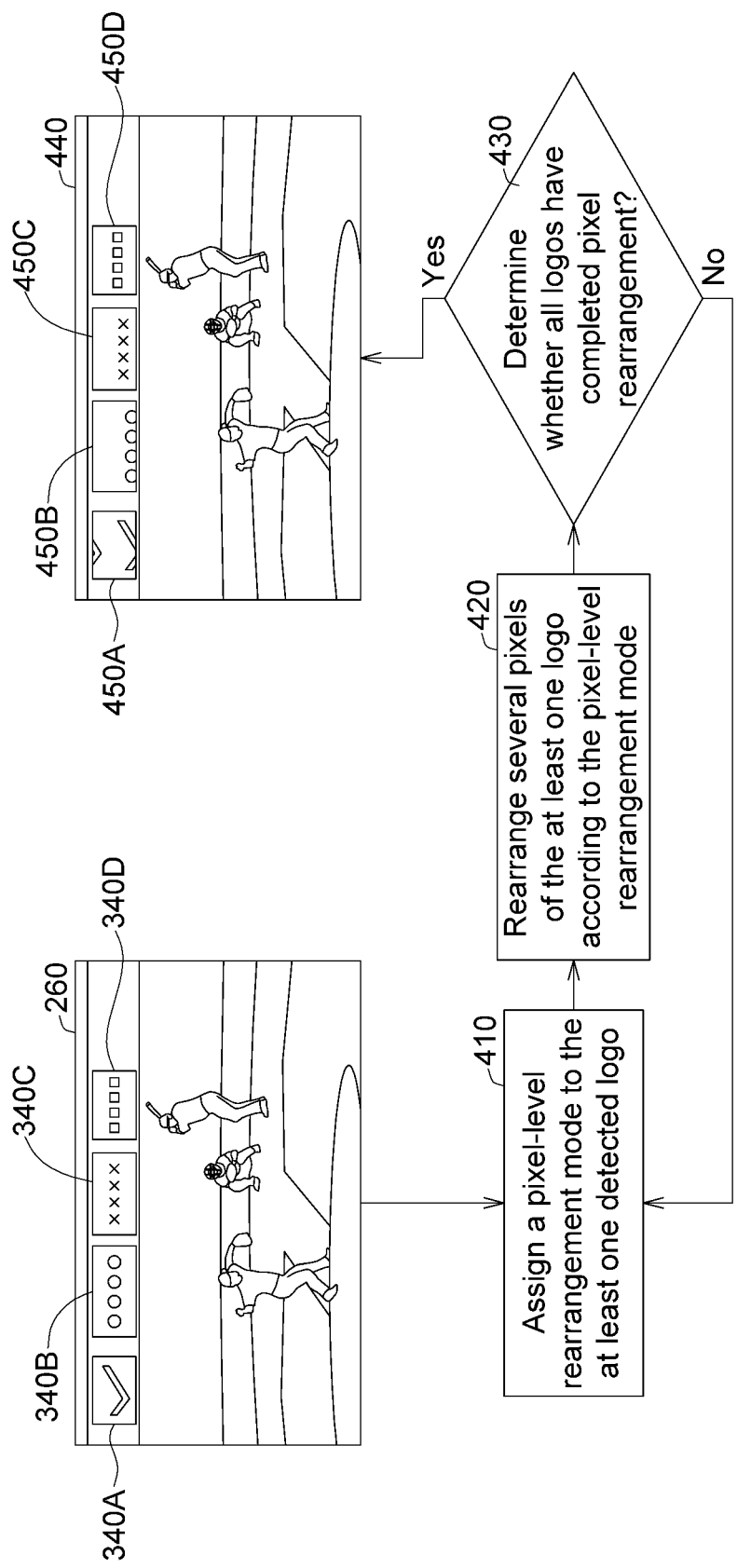
FIG. 4 illustrates sub-steps of "pixel-level rearrangement" according to an embodiment of the present disclosure.

FIG. 4 illustrates sub-steps of "pixel-level rearrangement" according to an embodiment of the present disclosure. In step 410 as indicated in FIG. 4, a pixel-level rearrangement mode is assigned to the at least one detected logo (340A~340D). In step 420, several pixels of the at least one logo are rearranged according to the pixel-level rearrangement mode. In step 430, whether all logos have completed pixel rearrangement is determined: if yes, the method returns to step 410; if not, the method terminates. In the example of FIG. 4, the logos 340A~340D of SOI 260 have completed pixel rearrangement and therefore become logos 450A~450D of SOI 440.

Figure 5:
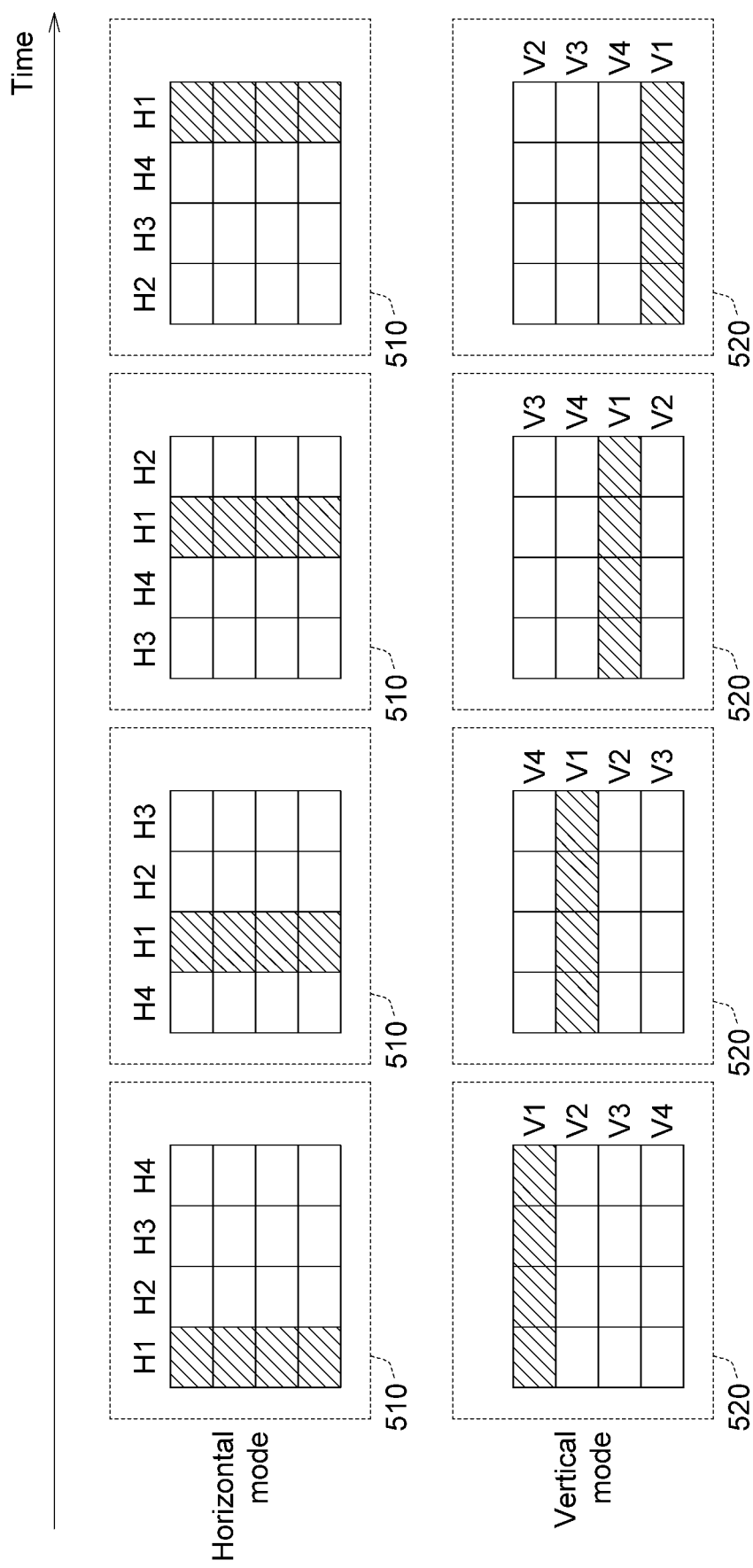
FIG. 5 is a schematic diagram of a pixel-level rearrangement mode according to an embodiment of the present disclosure.

FIG. 5 is a schematic diagram of a pixel-level rearrangement mode according to an embodiment of the present disclosure. The pixel-level rearrangement mode at least includes a horizontal mode or a vertical mode.

In the horizontal mode, the pixels of the logo 510 are horizontally rearranged according to timing sequence. Exemplarily but not restrictively, the logo 510 includes 4 pixel-blocks H1~H4. At the first timing sequence, the 4 pixel-blocks from left to right are H1~H4. At the second timing sequence, the 4 pixel-blocks H1~H4 are horizontally rearranged, and the rearranged pixel-blocks H1~H4 from left to right are H4, H1, H2 and H3. The rest can be obtained by the same analogy. In this way, the viewer will see dynamic change of the logo 510 in a horizontal direction and the physical logo which was originally static now becomes dynamic.

In the vertical mode, the pixels of logo 520 are vertically rearranged according to timing sequence. Exemplarily but not restrictively, the logo 520 includes 4 pixel-blocks V1~V4. At the first timing sequence, the 4 pixel-blocks from top to bottom are V1~V4. At the second timing sequence, the 4 pixel-blocks V1~V4 are vertically rearranged and the rearranged pixel-blocks V1~V4 from top to bottom are V4, V1, V2 and V3. In this way, the viewer will see dynamic change of the logo 520 in a vertical direction and the physical logo which was originally static now becomes dynamic.

In other embodiments of the present disclosure, pixel-level rearrangement can be performed on the logo to generate a rotation effect and the said arrangement is still within the spirit of the present disclosure.

Figure 6A:
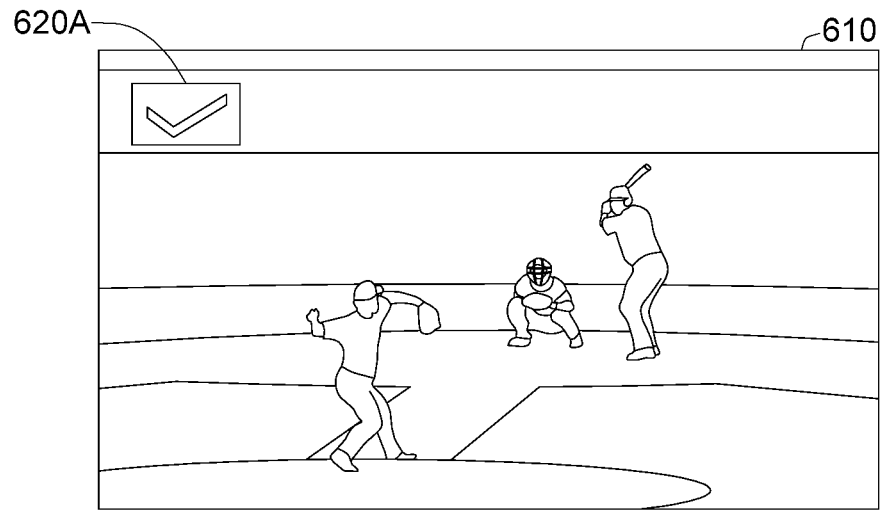
FIG. 6A to FIG. 6D illustrate the effects of pixel rearrangement according to an embodiment of the present disclosure.
Figure 6B:
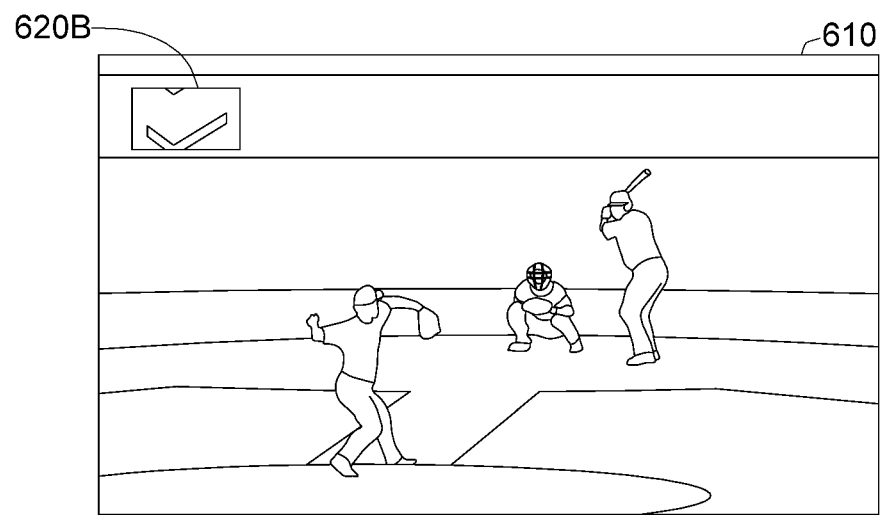
Figure 6C:
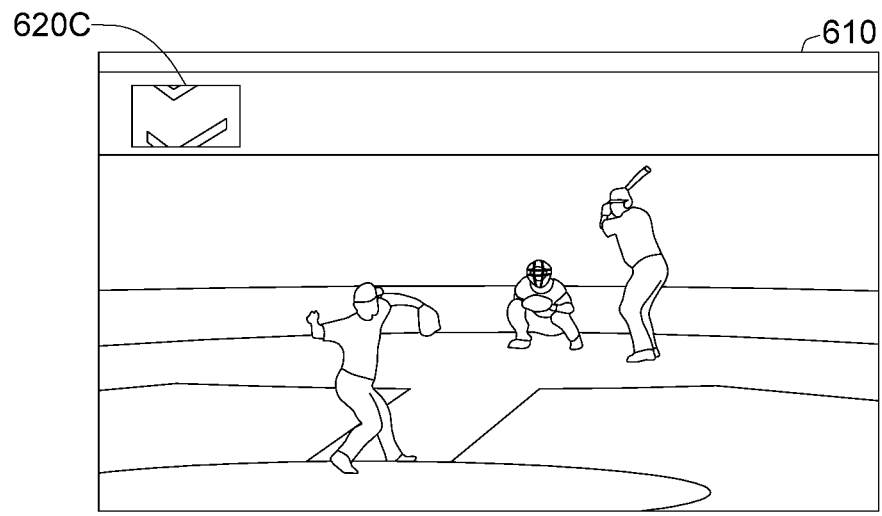
Figure 6D:
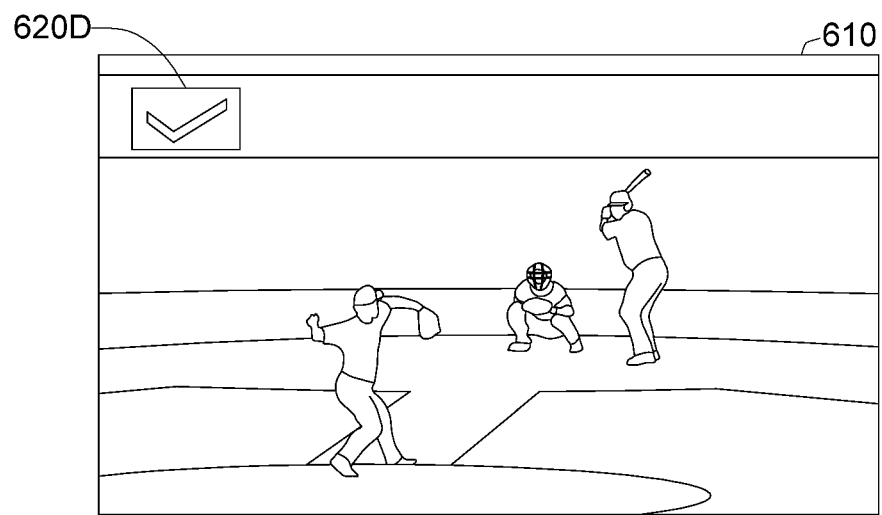

The effects of pixel-level rearrangement according to an embodiment of the present disclosure can be better understood with reference to FIG. 6A to FIG. 6D. As indicated in FIG. 6A to FIG. 6D, SOI 610 includes a logo 620A. As indicated in FIG. 6A, the logo 620A has not yet been processed with pixel rearrangement. As indicated in FIG. 6B to FIG. 6D, the logo 620A has completed pixel rearrangement and therefore becomes logos 620B~620D.

Figure 7:
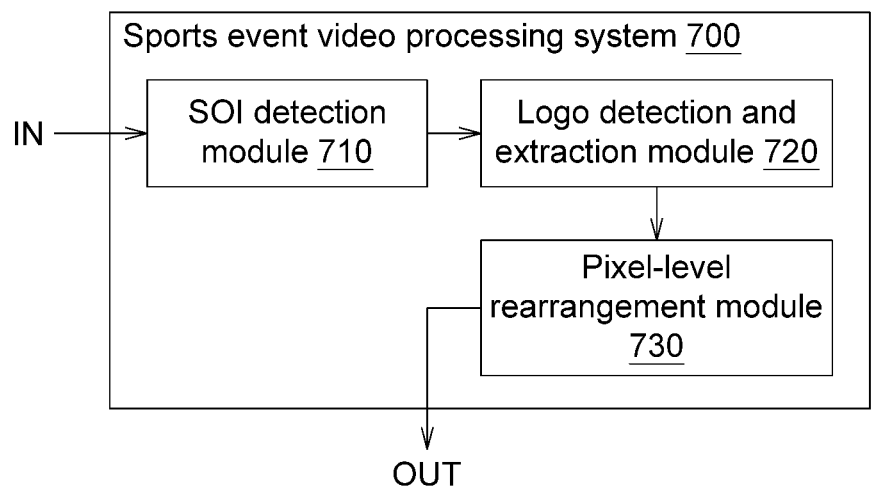
FIG. 7 is a functional block diagram of a sports event video processing system according to an embodiment of the present disclosure.

FIG. 7 is a functional block diagram of a sports event video processing system according to an embodiment of the present disclosure. The sports event video processing system 700 selectively includes at least one camera, such that the sports event video processing system 700 perform real-time or non-real-time video processing (automatic pixel-level rearrangement) on the sports event video captured by the at least one camera. The sports event video processing system 700 includes a SOI detection module 710, a logo detection and extraction module 720, and a pixel-level rearrangement module 730. The sports event video processing system 700 can selectively be realized by a computer system or a similar computing device.

The SOI detection module 710 receives a sports event input video IN and then performs SOI detection on the sports event input video IN to obtain at least one SOI.

The logo detection and extraction module 720 performs logo detection and extraction on the at least one SOI to detect at least one logo.

The pixel-level rearrangement module 730 performs pixel-level rearrangement on the at least one detected logo to generate a sports event output video OUT.

Detailed descriptions of the SOI detection module 710, the logo detection and extraction module 720, and the pixel-level rearrangement module 730 can be obtained with reference to above embodiments and are not repeated here.

In an embodiment of the present disclosure, SOI (target segment) can be extracted from the sports event input video using an SOI detection model (a CNN model), and the position and area of the (commercial) logo of each SOI (target segment) are detected by a logo detection model (another CNN model). That is, in an embodiment of the present disclosure, the physical (commercial) logo stably displayed on the frame is located according to timing sequence and space domain. Then, pixel-level logo rearrangement is performed on the physical (commercial) logo to provide the physical (commercial) logo with a dynamic effect to strike the eyes.

In an embodiment of the present disclosure, with least interference being created to the viewers, a dynamic effect is added to existing physical advertisements to add value to commercial broadcasting.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A sports event video processing method, comprising:
    receiving a sports event input video;
    performing shot of interest (SOI) detection on the sports event input video to obtain at least one SOI;
    performing logo detection and extraction on the at least one SOI to detect at least one logo;
    performing pixel-level rearrangement on the at least one detected logo by rearranging pixels of the at least one detected logo in a predetermined direction according to timing sequence of the pixels of the at least one detected logo for dynamically presenting the at least one detected logo which is static before pixel-level rearrangement; and
    outputting a sports event output video having completed pixel-level rearrangement.

2. The sports event video processing method according to claim 1, wherein,
    SOI detection is performed on the sports event input video to obtain the at least one SOI through convolution neural networks (CNN); and,
    logo detection and extraction is performed on the at least one SOI to detect the at least one detected logo through CNN.

3. The sports event video processing method according to claim 1, wherein, the step of performing SOI detection on the sports event input video to obtain at least one SOI comprises: obtaining the at least one SOI from the sports event input video using a first convolution neural networks (CNN) CNN model having completed shot label training.

4. The sports event video processing method according to claim 3, wherein,
    in a training stage, shot and/or scene definition is performed on a relevant training video to obtain a plurality of the training data; and
    the first CNN model is trained using the training data.

5. The sports event video processing method according to claim 4, wherein, the first CNN model obtains a start frame index and an end frame index of the at least one SOI.

6. The sports event video processing method according to claim 1, wherein, the step of performing logo detection and extraction on the at least one SOI comprises:
    performing logo detection on the at least one SOI to detect the at least one detected logo using a second CNN model having completed logo recognition training.

7. The sports event video processing method according to claim 6, wherein, a commercial logo database is inputted to the second CNN model for training logo recognition.

8. The sports event video processing method according to claim 1, wherein, the step of performing pixel-level rearrangement on the at least one detected logo comprises:
    (a) assigning a pixel-level rearrangement mode to the at least one detected logo;
    (b) rearranging the plurality of pixels of the at least one detected logo according to the pixel-level rearrangement mode; and
    (c) determining whether the at least one detected logo has completed pixel rearrangement: if yes, the method returns to step (a); if not, the method terminates.

9. The sports event video processing method according to claim 8, wherein, the pixel-level rearrangement mode at least comprises a horizontal mode and a vertical mode.

10. The sports event video processing method according to claim 9, wherein,
    in the horizontal mode, horizontal rearrangement is performed on a plurality of pixel blocks of the at least one detected logo according to timing sequence; and,
    in the vertical mode, vertical rearrangement is performed on the plurality of pixel blocks of the at least one detected logo Weeks according to timing sequence.

11. A sports event video processing system, comprising:
- a shot of interest (SOI) detection module configured to receive a sports event input video and perform SOI detection on the sports event input video to obtain at least one SOI;
- a logo detection and extraction module configured to perform logo detection and extraction on the at least one SOI to detect at least one logo;
- a pixel-level rearrangement module configured to perform pixel-level rearrangement on the at least one detected logo by rearranging pixels of the at least one detected logo in a predetermined direction according to timing sequence of the pixels of the at least one detected logo for dynamically presenting the at least one detected logo which is static before pixel-level rearrangement,
- wherein, the sports event video processing system outputs a sports event output video having completed pixel-level rearrangement.

12. The sports event video processing system according to claim 11, wherein,
- the SOI detection module performs SOI detection on the sports event input video to obtain the at least one SOI through convolution neural networks (CNN); and,
- the logo detection and extraction module performs logo detection and extraction on the at least one SOI to detect the at least one detected logo through CNN.

13. The sports event video processing system according to claim 11, wherein, the SOI detection module is configured to:
- obtain the at least one SOI from the sports event input video using a first convolution neural networks (CNN) CNN model having completed shot label training.

14. The sports event video processing system according to claim 13, wherein,
- in a training stage, the SOI detection module performs shot and/or scene definition on a relevant training video to obtain a plurality of the training data; and
- the SOI detection module trains the first CNN model using the training data.

15. The sports event video processing system according to claim 14, wherein, the SOI detection module obtains a start frame index and an end frame index of the at least one SOI using the first CNN model.

16. The sports event video processing system according to claim 11, wherein, the logo detection and extraction module performs logo detection on the at least one SOI to detect the at least one detected logo using a second CNN model having completed logo recognition training.

17. The sports event video processing system according to claim 16, wherein, a commercial logo database is inputted to the second CNN model for the logo detection and extraction module to perform logo recognition training on the second CNN model.

18. The sports event video processing system according to claim 11, wherein, the pixel-level rearrangement module is configured to:
- assign a pixel-level rearrangement mode to the at least one detected logo;
- rearrange the plurality of pixels of the at least one detected logo according to the pixel-level rearrangement mode; and
- determine whether the at least one detected logo has completed pixel rearrangement.

19. The sports event video processing system according to claim 18, wherein, the pixel-level rearrangement mode at least comprises a horizontal mode and a vertical mode.

20. The sports event video processing system according to claim 19, wherein,
- in the horizontal mode, the pixel-level rearrangement module performs horizontal rearrangement on a plurality of pixel blocks of the at least one detected logo according to timing sequence; and,
- in the vertical mode, the pixel-level rearrangement module performs vertical rearrangement on the plurality of pixel blocks of the at least one detected logo according to timing sequence.

* * * * *